Nov. 21, 1950  F. T. HALL  2,530,463

CONTINUOUS SAMPLE COLLECTING DEVICE

Filed May 12, 1945

INVENTOR
FREDERICK T. HALL
BY Hudson & Young
ATTORNEYS

Patented Nov. 21, 1950

2,530,463

UNITED STATES PATENT OFFICE 2,530,463

CONTINUOUS SAMPLE COLLECTING DEVICE

Frederick T. Hall, Bartlesville, Okla., assignor to Phillips Petroleum Company, a corporation of Delaware Application May 12, 1945, Serial No. 593,466

4 Claims. (Cl. 73—421.5)

This invention relates to an apparatus for sampling gases. In one of its more specific aspects it relates to an apparatus for composite, weighted and representative sampling of gases, and to a method of taking the same.

Many devices have been used in sampling solid materials, for example mechanical samplers which cut out a definite proportion of material in transit. Most of such devices obtain a composite but not a weighted or representative sample since operation is based on the time rather than on a rate of flow factor. Devices for the sampling of liquids are comparatively simple provided the sampled liquids are non-volatile. The sampling of gases and/or of liquids which are gases at atmospheric conditions is a more difficult problem. It is to this latter problem that my invention is directed.

An object of my invention is to provide an apparatus for use in the sampling of gases, and to provide a method of sampling gases.

Another object of my invention is to provide an apparatus for use in taking composite, weighted, representative samples of gases.

Still another object of my invention is to provide an apparatus for use in taking composite, weighted, representative samples of gases or gases carrying liquid in mist form, or liquids easily gasified under atmospheric conditions.

Figure 2:
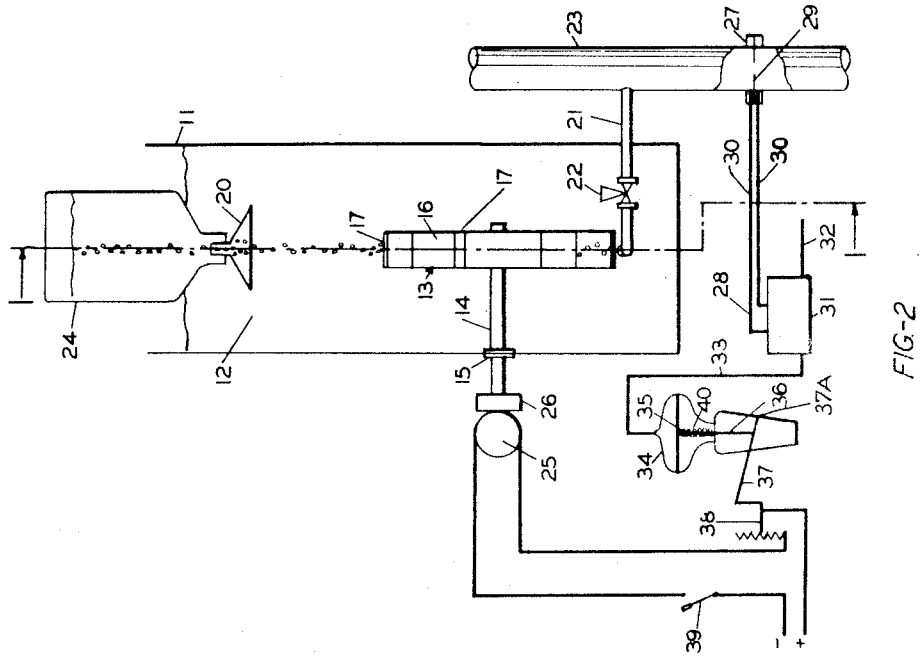
Figure 1:
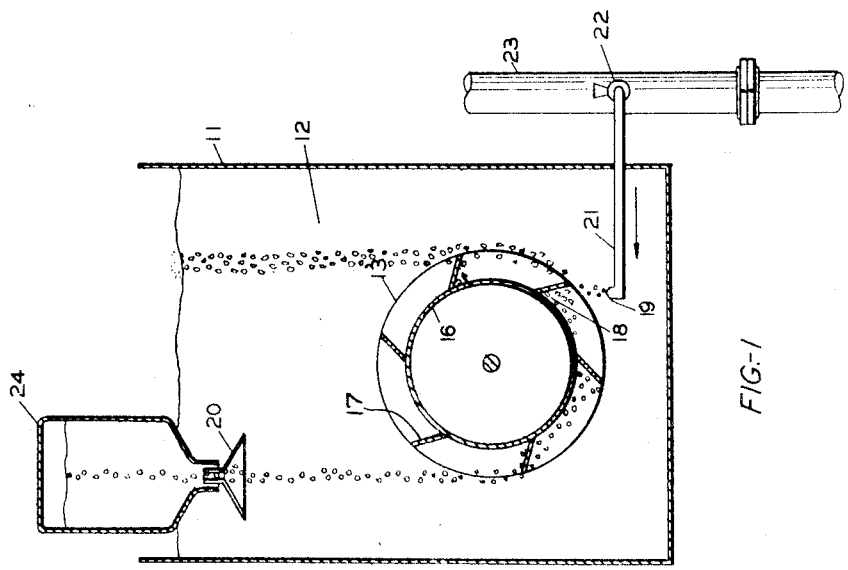

Still other objects and advantages of my apparatus will be apparent from a careful study of the following disclosure, in which Figure 1 is a diagrammatic sectional elevation of my fluid sampling apparatus taken on the line 1—1 of Figure 2.

Figure 2 is a diagrammatic end elevation of my apparatus.

Referring to the drawing and specifically to Figure 1 numeral 11 refers to a tank or other vessel in which a liquid 12 is held for excluding air or foreign gas from the gas sample. A sampling wheel 13 is fully immersed in this liquid and the wheel is so disposed as to rotate in a vertical plate. The wheel 13 is rigidly supported on a shaft 14 which extends through a side wall of the vessel for motive power purposes. A packing gland 15 prevents leakage of liquid while permitting shaft 14 to rotate freely. The sampling or bucket wheel 13 is composed of two circular plates held together by a circular band of metal 16 giving the wheel the appearance of a spool or reel of relatively short length compared to the diameter. Bucket plates 17 are welded or otherwise rigidly attached to the circular metal band 16 and to the two circular plates to make a type of gastight "bucket" 18 under which gas in process of sampling is caught and transferred from the stream of rising gas bubbles coming from a nozzle 19 to a position directly under an inverted funnel 20. With all the bucket plates 17 being of the same size and welded in place at the same angle with respect to the radius of the bucket wheel all buckets have substantially the same volumes.

A tube 21 conducts the gas sample from a main gas line 23 to the upwardly directed nozzle 19. This sample line contains a manually operated valve 22 for adjusting or controlling the amount of gas to be withdrawn from the main gas line 23. This valve may well be of a needle type valve since such valves can be rather finely adjusted even manually.

A gas sampling bottle 24 or other container of sufficient size is filled with liquid and inverted as shown in the drawing. The funnel and bottle are supported by any means suitable, said means is not shown on the drawing for purposes of simplicity.

The wheel shaft 14, as mentioned hereinbefore extends through the sidewall of the vessel 11 and is attached at its outer extremity to a source of power, such as a variable speed electric motor 25 either directly or through a speed reduction mechanism 26.

It is intended that the speed of rotation of the bucket wheel shall be proportional to the rate of fluid flow in the main transfer line 23. In other words if it is desired to take a composite, weighted, representative sample over a period of time, such an arrangement of controls is necessary. To do this I use a rate of flow controller mechanism 28. This rate of flow controller mechanism 28 is composed of several parts, including two pipe flanges 27 having a standard orifice plate 29 inserted therebetween. The flanges are drilled to take a small pipe, such as ⅛ inch pipe, which pipes or tubes 30 lead to the controller instrument 31. Pipe 32 brings "instrument air" of very constant pressure from a source, not shown, to the instrument, while pipe 33 conducts "control air" from the instrument to a diaphragm motor mechanism 34. The diaphragm 35 of this latter mechanism is made of rubber or other gas-tight, flexible, sheet material. To the center of this diaphragm is attached a push rod 36 the other end of which in turn is attached to member 37 which is pivoted at 37A. The movable end of this pivoted member is attached to a variable resistance mechanism 38 which upon movement of the diaphragm 35 operates to vary or to control voltage from a source of power so that the speed of electric motor 25 may be varied accordingly. The rate of flow controller, motor diaphragm and variable resistance apparatus are standard equipment and may be purchased as such.

For carrying out a hydrocarbon sampling operation according to my invention, I construct and assemble the apparatus as hereinabove described. The tank 11 is now filled with a brine or salt water solution since hydrocarbon gases are not at all or only very slightly absorbed by such a solution. Similarly the sample bottle 24 is filled with such a brine solution and inverted over the funnel 20 as indicated in the drawing. With the tank and bottle filled with brine, and with hydrocarbon gas or mixture of such gases, for example, passing through the main line 23, the needle valve 22 is opened to such an extent that gas issues from the sample tube nozzle 19 and bubbles upward through the brine as indicated in Figure 1 of the drawing. A switch 39 in the power line to the electric motor 25 is closed and the operation of the mechanism is thus begun. When the needle valve 22 is opened the proper extent sufficient gas issues from nozzle 19 to fill each "bucket" as it passes downward and countercurrently to the upward flowing gas bubbles and an excess of bubbles overflows each bucket and rises to the top of the brine to be lost to the air or disposed of as desired. Each bucket then passes on around its circular path and at about the bottom of its path of travel the gaseous content thereof begins to flow upward as shown in Figure 1, the bubbles being caught under the funnel 20 and diverted into the gas sampling bottle 24.

In case the flow of hydrocarbon gas or gases through the main gas line is constant, then the pressure differential across the orifice member 29 remains constant and the speed of the electric motor and of the bucket wheel accordingly remains constant. If the gas sample bottle is a 5 gallon bottle then the capacity of the wheel buckets may be relatively small and such that in normal operation the bottle may be nearly filled with sample during a 12 or 24 hour period if samples over such periods are desired.

When increased gas flow occurs in main line 23, then the pressure differential across the orifice 29 increases and controller 31 operates to increase the air pressure in the control air line 33 and accordingly the air pressure on the diaphragm increases, the push-pull rod 35 drops to lower member 37 to cut out a portion of the variable resistance which operation permits increased voltage to the electric motor and its speed and accordingly the sample bucket wheel speed is increased. Thus, the speed of sample taking is increased when the gas flow in pipe 23 increases.

Likewise, when gas flow in pipe 23 decreases the pressure differential across the orifice decreases and the controller 31 operates to decrease the control air pressure on top of the diaphragm and a spring 40 then raises the diaphragm. The rheostat then operates to decrease the voltage to the electric motor 25 and the speed of the latter and the bucket wheel decreases and a slower rate of gas sample collecting results.

There must always be an excess of gas issuing from the nozzle 19 over that transferred by the buckets into the sample bottle so that if the sample wheel speed is increased the sample buckets will still be completely filled with sample gas.

My general method of sampling may be applied to the sampling of hydrocarbon liquids when the latter are easily vaporized at atmospheric temperature and pressure. In this case, the orifice plate 29 must be one adapted to measuring the flow of liquids, and such are commercially available. The needle valve 22 will then be opened very slightly or just enough to permit sufficient flow of liquid therethrough. Upon passage through this needle valve the liquid hydrocarbon easily vaporizes in the sample tube 21 so that only gas issues from the nozzle 19 and from the nozzle 19 the sampling operation is similar to that described in relation to gas sampling. When the liquid pressure differential across the orifice 29 increases or decreases, the rate of flow apparatus 31 operates to increase or decrease the control air pressure and the R. P. M. of the bucket wheel increases or decreases.

In this latter case, that is, the sampling of liquids, all compounds in the stream should be vaporized on passage through the needle valve 22 as their pressure is reduced to atmospheric.

My apparatus may be so operated as to give a 5 gallon or a 10 gallon bottle of sample in substantially any time desired, as for example, over 6 hour periods, 12 or 24 hours, or even shorter or longer times. Likewise smaller or larger bottles or bottles of any size may be used.

In case other gases than hydrocarbons are to be sampled some other liquid than a salt water brine may need be used. The principle points to be considered are the gas must not be dissolved nor a component gas of a mixture must not be selectively dissolved by the liquid or representative samples cannot be taken, and the liquid should be reasonably inexpensive.

My apparatus is flexible in construction and its use or operation may be varied to meet many conditions. I have found it to be especially satisfactory for the sampling of gas streams in oil refineries, gasoline plants, and in synthetic hydrocarbon plants. Even though the gas composition changes concurrently with increased flow, the sample taken is a true weighted, representative sample of the entire amount of gas passed during the sampling period.

The materials of construction need not be special excepting possibly that which is submerged in brine. This should of course be resistant to the corrosive action of brine. The bucket plates 17 should possibly be welded to the wheel portion so that the buckets will be gas tight.

The controller and electrical portions of my apparatus are standard equipment and descriptions may be found in equipment catalogues, but the combination of parts to provide a gas sampler constitutes one aspect of my invention. Numerous changes and substitution of old elements may be made without departing from my invention which is defined by the following claims.

Having described my invention, I claim:

1. A continuous composite representative gas sample collecting device for collecting a sample of gas from a gas line in which the rate of flow varies during the time of collecting said sample and from which line substantially equal volumes of the sample are to be taken from substantially equal divisional volumes of the total gas flowing in said gas line during the taking of the sample, comprising in combination a tank; a liquid which is substantially non-absorbent to said gas within said tank; means for collecting given volumes of gas samples which means comprises a wheel having a plurality of substantially equal sized pockets substantially equally spaced about its periphery, said wheel being submerged in said liquid; means for rotating said wheel in said liquid at a speed substantially directly in proportion to the rate of flow in said gas line and adapted to be rotated, said pockets being so positioned on said wheel that they will collect a rising gas on their downward motion through said liquid as the wheel is rotated in its normal direction of rotation; a conduit adapted to constantly convey a portion of gas extending from said gas line to a point under said gas sample collecting means, said conduit having an orifice under said collecting means; and a gas sample collecting container communicating with said tank below the surface of the liquid and positioned above said wheel to collect and retain the measured volumes of gas samples as they escape from said gas collecting wheel.

2. A continuous composite representative volatile fluid sample collecting device comprising in combination a tank; a liquid which is substantially non-absorbent to said volatile fluid, within said tank; a fluid conduit extending from said fluid containing line into said liquid and adapted to carry fluid at a rate substantially proportionate to the rate of flow in said line; a fluid sample collecting container communicating with said tank below the surface of said liquid; fluid sampling means having a pocket disposed in said liquid above an outlet in said conduit to collect uniform amounts of fluid by displacement of the liquid by the fluid entering said pocket and to direct the escape of all excess quantities of fluid away from said collecting container; and actuating means to move said pocket successively into fluid collecting position and then into a position where said fluid will flow into said container operatively connected to said fluid sampling means, said actuating means moving said pocket at a rate substantially directly proportionate to the rate of flow in said gas line.

3. A continuous composite representative volatile fluid sample collecting device of claim 2 in which the fluid sampling means has a plurality of pockets disposed therein.

4. A continuous composite representative gas sample collecting device for collecting a sample of gas from a gas line in which the rate of flow varies during the time of collecting said sample and from which line substantially equal volumes of the sample are to be taken from substantially equal divisional volumes of the total gas flowing in said gas line during the taking of the sample, comprising in combination a tank capable of retaining a liquid therein; a conduit for constantly conveying a portion of gas extending from said gas line to a point within the lower portion of said tank; gas sampling means having a pocket therein, said means being positioned above said conduit; a gas sample collecting container positioned above said gas sampling means; and actuating means for moving said pocket successively into gas collecting position and then into a position where gas released from said pocket rises directly into said gas sample collecting container operatively connected to said gas sampling means, said actuating means adapted so as to move said pocket at a rate substantially directly proportionate to the rate of flow in said gas line.

FREDERICK T. HALL.

REFERENCES CITED

The following references are of record in the file of this patent:

UNITED STATES PATENTS

| Number | Name | Date |
| --- | --- | --- |
| 1,364,035 | Carter | Dec. 28, 1920 |
| 2,245,679 | Kelley | June 17, 1941 |
| 2,356,845 | Hines | Aug. 29, 1944 |
| 2,380,977 | Lewis | Aug. 7, 1945 |

FOREIGN PATENTS

| Number | Country | Date |
| --- | --- | --- |
| 468 | Great Britain | of 1911 |

Certificate of Correction

Patent No. 2,530,463 November 21, 1950

FREDERICK T. HALL

It is hereby certified that error appears in the printed specification of the above numbered patent requiring correction as follows:

Column 1, line 44, for the word "plate" read *plane*;

and that the said Letters Patent should be read as corrected above, so that the same may conform to the record of the case in the Patent Office.

Signed and sealed this 30th day of January, A. D. 1951.

[SEAL]

THOMAS F. MURPHY,
*Assistant Commissioner of Patents.*